(12) United States Patent
Klier

(10) Patent No.: US 7,676,308 B2
(45) Date of Patent: Mar. 9, 2010

(54) METHOD FOR OPERATING A STEERING SYSTEM OF A MOTOR VEHICLE

(75) Inventor: Willy Klier, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 1309 days.

(21) Appl. No.: 11/134,817

(22) Filed: May 19, 2005

(65) Prior Publication Data

US 2006/0021821 A1    Feb. 2, 2006

(30) Foreign Application Priority Data

Jun. 15, 2004    (DE) ...................... 10 2004 028 828

(51) Int. Cl.
*A01B 69/00* (2006.01)
(52) U.S. Cl. .......................... 701/41; 701/42
(58) Field of Classification Search ............. 701/41–43; 189/441–446
See application file for complete search history.

(56) References Cited

U.S. PATENT DOCUMENTS

| 7,308,346 B2* | 12/2007 | Sugitani ............... 701/41 |
| 7,322,439 B2* | 1/2008 | Hara et al. ............ 180/402 |
| 7,325,644 B2* | 2/2008 | Sakai .................. 180/402 |
| 7,383,112 B2* | 6/2008 | Shin et al. ............ 701/41 |
| 7,434,654 B2* | 10/2008 | Birsching et al. ..... 180/422 |

FOREIGN PATENT DOCUMENTS

| DE | 197 51 125 | 9/1998 |
| DE | 100 12 133 | 9/2001 |
| DE | 100 32 340 | 1/2002 |
| DE | 103 25 484 | 3/2004 |

* cited by examiner

*Primary Examiner*—Richard M. Camby
(74) *Attorney, Agent, or Firm*—Jordan and Hamburg LLP

(57) ABSTRACT

A method for operating a steering system of a motor vehicle, with a steering handling device for specifying a steering wheel angle ($\delta_S$) as a measure of a desired steering angle ($\delta_{Fm}$) for at least one steerable wheel of the motor vehicle, a steering gear with a pinion, which converts a pinion angle ($\delta_G$), which depends on the steering wheel angle ($\delta_S$), into the steering angle ($\delta_{Fm}$) of the at least one steerable wheel of the motor vehicle, a superimposing arrangement for generating an additional angle ($\delta_M$) by means of a control drive, especially an electric motor and for producing the pinion angle ($\delta_G$) by superimposing the additional angle ($\delta_M$) on the steering wheel angle ($\delta_S$) by a superimposing gear mechanism and a control device for carrying out the method for operating the steering system and for triggering the control drive and being carried out by a control device of the steering system. At least one function, on the basis of a model, monitors the dynamics of the control drive.

16 Claims, 2 Drawing Sheets

METHOD FOR OPERATING A STEERING SYSTEM OF A MOTOR VEHICLE

BACKGROUND OF THE INVENTION

The invention relates to a method for operating a steering system of a motor vehicle.

The invention also relates to a computer program and a computer program product with program coding means, in order to carry out such a method for operating a steering system on a computer, especially on a microprocessor, of a control device of the steering system, and to such a control device.

The DE 197 51 125 A1 discloses such a method for operating a steering system, which has superimposing means, which generate an additional angle and superimpose this additional angle on the steering wheel angle specified by the steering handling device. Moreover, the steering wheel angle is superimposed on the movement (additional angle or motor angle) of a control drive, that is, an electric motor, by means of a superimposing gear mechanism (such as a planetary gear). With the help of the superimposing gear mechanism, it is possible to superimpose an additional angle on the steering wheel angle, specified by the steering handling device, in order to increase the driving stability and the comfort, so that variable transformation ratio between the steering wheel angle and the average steering angle of the steerable wheels of the motor vehicle, which depends on the driving dynamics and comfort, is achieved. By these means, it is, for example, possible, from a safety point of view, to restore a motor vehicle, which is threatening to swerve, to a stable driving situation by an appropriate correction of the steering angle. The superimposing means can support other driving dynamics systems (such as an electronic stability program (ESP) or an anti-locking system (ALS). From a comfort point of view, it is also possible, for example, to superimpose a speed-dependent additional angle on a steering wheel angle. By these means, the transformation ratio can be set to a relatively small value at low driving speeds, that is, a relatively small rotation of the steering handling device leads to a relatively large steering angle of the wheels. On the other hand, at high vehicle speeds, a relatively large transformation ratio can be set, so that the driving stability of the motor vehicle is increased.

It is a disadvantage that the steering system itself or the further driving dynamics systems, which are to be supported, are not informed of the actually available dynamics or the functionality of the superimposing means or of the control drive. Even other effects, such as temperature or reaction moments and forces, act on the steering system or control drive. By these means, nominal values for additional angles to be superimposed and additional angular velocities, which cannot be realized by the control drive—whether it be due to a functional disorder or simply because of an actual driving situation (such as the state of the internal combustion engine of the motor vehicle)—of the useful functions of the steering system itself (such as a variable steering ratio) as well as of the further driving dynamics systems could be avoided.

SUMMARY OF THE INVENTION

It is an object of the present invention to create a method for operating a steering system, a computer program, a computer program product and a control device of the type mentioned above, which improve the reliability, availability and functional safety of the steering system.

Due to the inventive method for operating a steering system, the dynamics and functionality of the control drive are monitored advantageously for generating the additional angle. This available information can be used by the steering system and by other driving dynamics systems (ESF, ASR, ALS, etc.). On the whole, this leads to an increased reliability and functional safety of the steering system.

In an advantageous further development of the invention, provisions may furthermore be made so that a first function determines the status of the dynamics of the control drive by means of a difference between the variation in the measured additional angle as a function of time and a nominal, model-based variation in the additional angle of the control drive as a function of time, the difference in the angle, angular velocity and angular acceleration being calculated in each case. In this connection, the first function indicates that the status of the dynamics of the control drive is "O" or "OK", when the absolute amounts of all difference values of angles, angular velocities and angular accelerations are less then or equal to their corresponding, specified threshold values; otherwise "1" or "not OK" are indicated.

By these measures, the actual measured dynamics of the control drive are compared with anticipated, model-based dynamics of the control drive by means of a model of the control drive. By these means, a status of the control drive can be determined with sufficient accuracy. It is important to recognize each dynamic defective behavior of the control drive with the least possible latent defect time by indicating the status "not OK" without, however, initiating unnecessary defect alarms at the same time. For this reason, the respective threshold value should be designed so that the valid working range of the control drive is covered as completely as possible.

In accordance with a preferred embodiment of the invention, a real time-capable model of the $2^{nd}$ order is used as the dynamics model for the control drive, which receives a nominal value of the additional angle as input quantity and, in real-time, calculates model-based actual values for the additional angle, the additional angular velocity and the additional angular acceleration.

It is furthermore advantageous when a second function, on the basis of the model, estimates a maximum positive and/or negative, available, additional additional-angle speed of the control drive.

By these means, further driving dynamics systems can be informed of a maximum, available, dynamic dynamics reserve of the drive control, that is, an additional superimposing speed. For control and regulating systems, the driving dynamics systems can then, in turn, adjust to these conditions and, for example, avoid from the very start nominal value specifications for the superimposing means, the implementation of which is not possible because of the maximum available dynamics of the control drive (positive/negative, depending on the actual and opposite direction of rotation).

As already stated above, it is advantageous if the outputs of the first and/or the second function or the status of the dynamics of the control drive and/or the estimated maximum available additional positive and/or negative additional angle-speed of the control drive are made available to other driving dynamics systems, especially ESP, ASR and ALS, for example, over at appropriate interface (over a CAN bus of the motor vehicle).

Pursuant to the invention, provisions can be made so that the control device, among other things, receives the nominal value of the additional angle of, the additional angle, the pinion angle, the steering wheel angle and the vehicle speed as input quantities, especially from sensors or other vehicle systems or calculates them by means of other input quantities, especially the rotational speeds of the wheels, by means of a suitable model especially of the steering system.

Especially for triggering the superimposing means, the steering system has an electronic control device, on which the inventive method for operating the steering system runs. As input quantities, the control device receives, among other things, the additional angle, the steering wheel angle, the pinion angle, the vehicle speed or the like from sensors and/or other vehicle systems calculates these quantities on the basis of other quantities of the steering system or of the motor vehicle. On the basis of these input quantities, appropriate electrical triggering signals for triggering the superimposing means are then determined.

The method for operating an inventive steering system advantageously is realized as a computer program on the control device of the steering system. For this purpose, the computer program is stored in a memory element of the control device. The method is carried out by processing on a microprocessor of the control device. The computer program may be stored on a computer-readable data storage medium (diskette, CD, DVD, hard drive, USB memory stick or the like) or on an Internet server as computer program product, and transferred from their to the memory element of the control device.

In the following, an example of the invention is shown in principle by means of the accompanying drawings.

DESCRIPTION OF THE PREFERRED EMBODIMENTS

Figure 1:
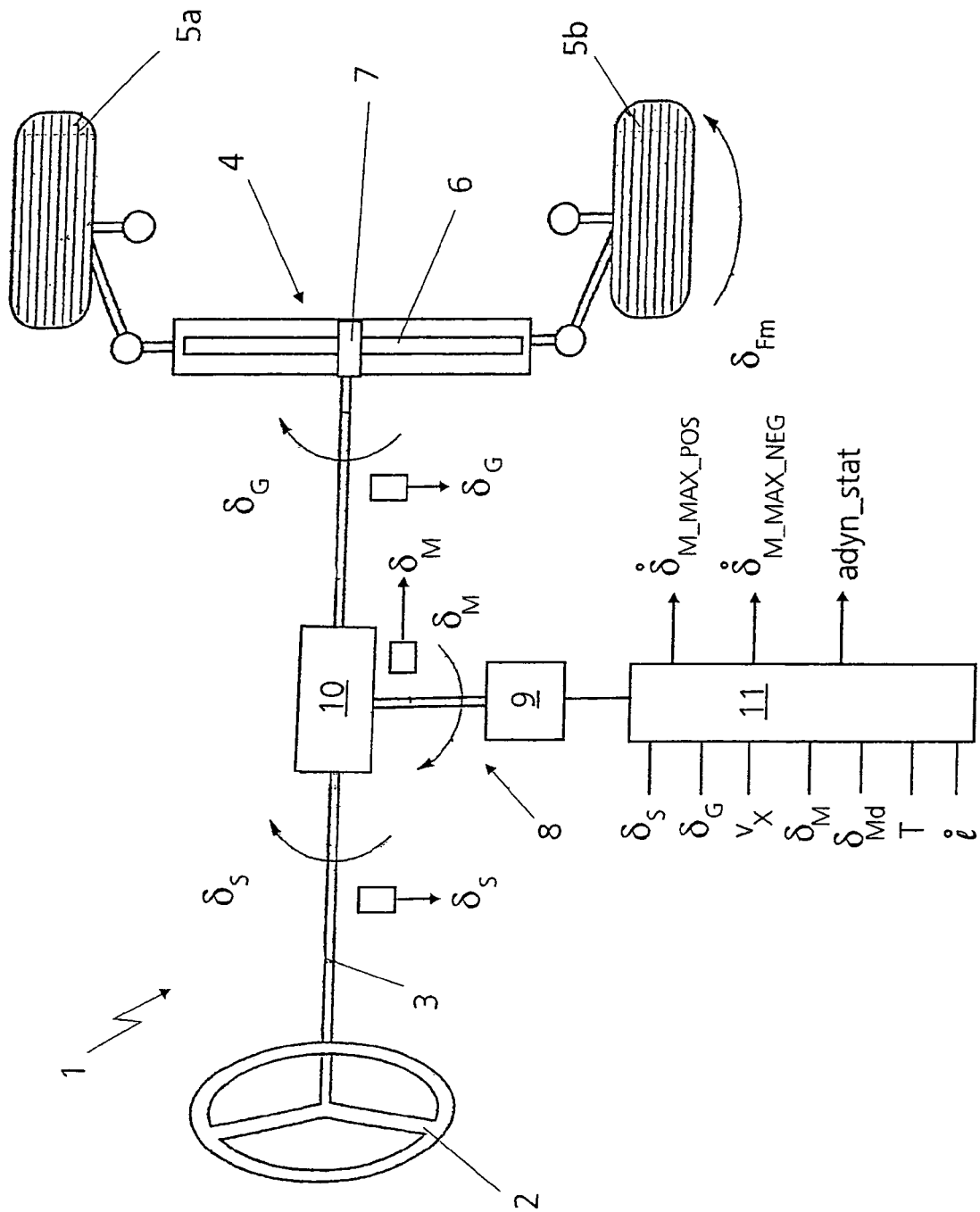
FIG. 1 shows an outline of a superimposing steering system, which is operated by an inventive method.

FIG. 1 shows a steering system 1 of a motor vehicle. The steering system 1 has a handling device 2, of which is constructed as a steering wheel. The steering were 2 is connected over an articulated shaft 3 with a steering gear 4. The function of the steering gear 4 is to convert an angle of rotation of the articulated shaft 3 into a steering angle $\delta_{Fm}$ of steerable wheels 5a, 5b of the motor vehicle. The steering gear 4 has a gear rack 6 and a pinion 7, at which the articulated shaft 3 engages. Furthermore, the steering system 1 includes superimposing means 8, which have a control drive 9, constructed as an electric motor and a superimposing gear mechanism 10, driven by the latter. The superimposing gear mechanism is constructed as a planetary gear train 10. A steering wheel angle $\delta_S$ is specified by the steering wheel 2 as a measure of a desired steering angle $\delta_{Fm}$ of steerable wheels 5a, 5b of the motor vehicle. With the help of the electric motor 9, an additional angle $\delta_M$ is then generated and the steering wheel angle $\delta_S$ is superimposed on it by the superimposing drive 10. The additional angle or motor angle $\delta_M$ is generated to improve the driving dynamics of the motor vehicle and the comfort. The sum of the steering angle $\delta_S$ and the additional angle $\delta_M$ gives the pinion angle $\delta_G$.

Downstream from the superimposing mains 8, the steering system 1, in a different example, could have additionally a servo drive (not shown), which serves, particularly, for variably supporting the merriment and is also referred to as an electrohydraulic converter. The servo drive comprises a hydraulic pump, which transports a hydraulic fluid over a hydraulic valve into the steering gear 4. Over the hydraulic valve, the flow of the hydraulic fluid is directed to the one or the other end of the gear rack 6 in order to bring about, by so doing, an appropriate moment support in the desired direction. For the present invention, this is, however, not absolutely essential.

The steering system 1 has an electronic control device 11, which serves, for instance, for triggering the electric motor 9. An inventive method for operating the steering system 1 runs on the electronic control device 11. By these means, the electric motor 9, for instance, is triggered with an electric triggering signal $\delta_{Md}$, which corresponds to the nominal value of the additional angle $\delta_M$, which is to be superimposed by the control drive 9. The electric motor 9 is triggered as a function of the speed $V_X$ of the motor vehicle, that is, the transformation ratio between the steering wheel angle $\delta_S$ and the pinion angle $\delta_G$ or steering angle $\delta_{Fm}$ of the wheels 5a, 5b is adjusted by superimposing the steering angles $\delta_S$ with different speed-dependent additional angles $\delta_M$ as a function of the vehicle speed $v_X$. By these means, it is possible to specify, at low vehicle speeds $v_X$, a relatively small transformation ratio, at which a relatively small rotation of the steering wheel 2 leads to a relatively large steering wheel $\delta_{Fm}$ of the wheels 5a, 5b. Likewise, at a high vehicle speed $v_X$, it is conceivable to specify a relatively large transformation ratio for stability reasons. However, this dependence on the speed of the vehicle $v_X$ is also not absolutely essential for the invention.

So that the control function, quoted above, can be carried out, the control device 11 receives, as input signal, the actual vehicle speed $v_X$ (for example, over the CAN bus of the motor vehicle). In addition, the steering system 1 has sensors 12a, 12b, 12c, which measure the steering wheel angle $\delta_S$, the additional angle $\delta_M$ and the pinion angle $\delta_G$. As is evident from FIG. 1, the control device 11 is provided over the sensors 12a, 12b, 12c and other vehicle systems with the input signals, steering wheel angle $\delta_S$, pinion angle $\delta_G$, actual vehicle speed $v_X$, additional angle $\delta_M$, nominal value of the additional angle $\delta_{Md}$ (for example, from other driving dynamics systems), the actual temperature T (from a temperature sensor, which is not shown) and the course of the gear rack displacement l. Alternatively or additionally (for example, for monitoring plausibility), several of these quantities could also be calculated by means of the other or further input quantities (such as rotational speed of the wheels, etc.), especially with the help of suitable models.

As output signal, the control device 11 has a status value adyn_stat for the dynamics of the control drive 9 and the estimated, maximum available, additional positive $\delta_{M\_MAX\_POS}$ and negative $\delta_{M\_MAX\_NEG}$ additional angular velocity of the control drive 9. These outputs are made available over an appropriate interface (over the CAN bus of the motor vehicle) to other driving dynamics systems, especially to the ESP, ASR and ALS (the details of which are not shown). By these means, the other driving dynamics systems are informed of the maximum available dynamic reserve, that is, of the additional superimposing speed $\delta_{M\_MAX\_POS}$, $\delta_{M\_MAX\_NEG}$ of the control drive 9 and the status value adyn_stat of the dynamics of the control drive 9. The control and/or regulating systems of the driving dynamics systems can then adjust to these conditions and omit, for example, from the very start, specifying nominal values $\delta_{Md}$ for the superimposing means 8, the implementation of which is not possible because of the maximum available dynamics of the control drive 9.

The output signals adyn_stat, $\dot{\delta}_{M\_MAX\_POS}$ and $\dot{\delta}_{M\_MAX\_NEG}$ are generated by the inventive method for operating a steering systems. For this purpose, a first safety function ADYN (see FIG. 2) determines the status value adyn_stat for the dynamics of the control drive 9 and a second function DYNRES (see FIG. 3) determines the estimated, maximum available, additional positive $\dot{\delta}_{M\_MAX\_POS}$ and negative $\dot{\delta}_{M\_MAX\_NEG}$ additional angular velocity of the control drive 9.

Figure 2:
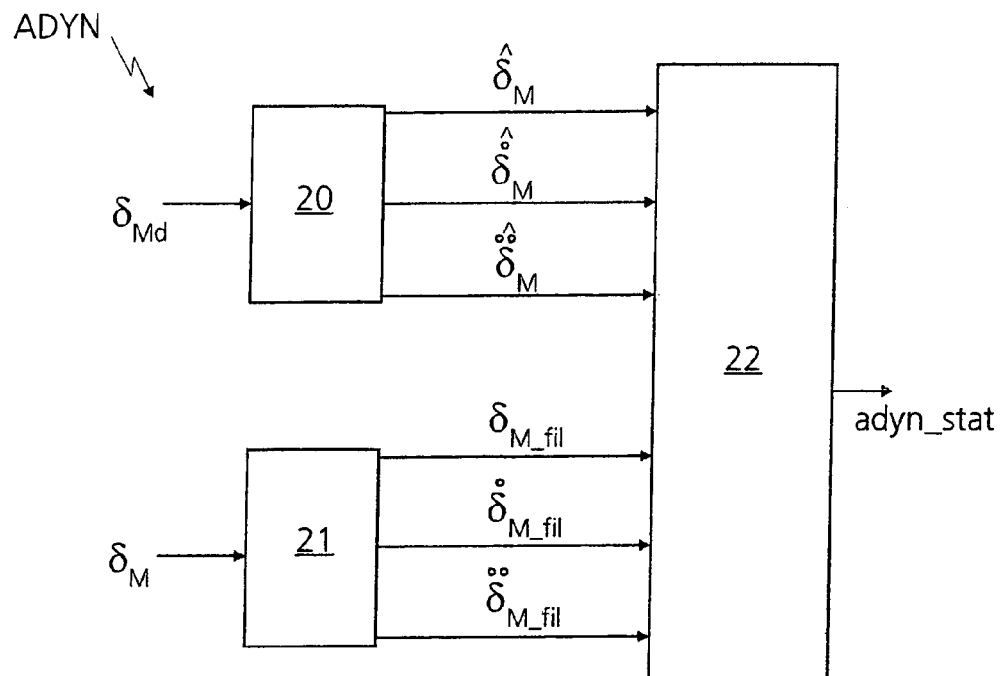
FIG. 2 shows an outline of a first function of the inventive method for monitoring the dynamics of the actuator.

In FIG. 2, the safety function ADYN is shown diagrammatically. A function block 20 represents a nonlinear real time-capable model of the second order of the control drive 9 and, as input signal, receives the nominal value of the additional angle $\delta_{Md}$, which is to be set at the control drive 9. On the basis of the model, the anticipated dynamics of the control drive 9 are calculated from the variation as a function of time of the nominal value of the additional angle $\delta_{Md}$. For this purpose, the anticipated actual values of the additional angle $\hat{\delta}_M$, the additional angular velocity $\hat{\dot{\delta}}_M$ and the additional angular acceleration $\hat{\ddot{\delta}}_M$ are calculated and transferred to a further function block 22. As input signal, a function block 21 receives the actually set additional angle $\delta_M$, which is measured by the sense of 12b. This additional angle $\delta_M$ is filtered and a derivative with respect to time is formed. The outputs of the function block 21, which also go to the function block 22, are formed by the filtered additional angle $\delta_{M\_fil}$, the speed of the filtered additional angle $\dot{\delta}_{M\_fil}$ and the acceleration of the filtered additional angle $\ddot{\delta}_{M\_fil}$. The function block 22 compares the model actual values $\hat{\delta}_M$, $\hat{\dot{\delta}}_M$ and $\hat{\ddot{\delta}}_M$ with the corresponding measured actual values $\delta_{M\_fil}$, $\dot{\delta}_{M\_fil}$ and $\ddot{\delta}_{M\_fil}$. The difference values, so obtained, are compared quantitatively with specified threshold values. If the amounts of all difference values are smaller than or equal to the corresponding threshold value, "O" or "OK" is put out by the function block 22 as output signal adyn_stat (electrical signal); otherwise, the output signal is "1" or "not OK". Moreover, it is important to recognize each dynamic defective behavior of the control drive 9 with the least possible defect latent time, that is, to put out a "not OK" adyn_stat status, without, at the same time, initiating unnecessary false alarms. For this reason, the respective threshold values for the respective steering system 1 of a motor vehicle must be selected so that the valid working range of the control drive, including any necessary tolerance ranges, is covered as completely as possible. Moreover, in a different example, status specifications such as "OFF", "RESET" or "NORMAL" can be processed by an imposed function or defect strategy.

Figure 3:
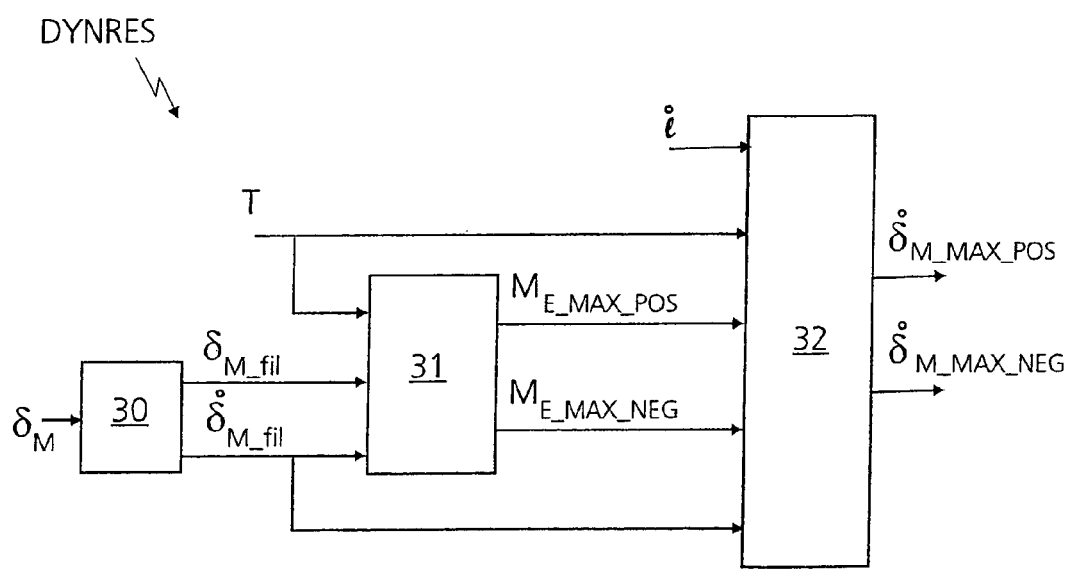
FIG. 3 shows an outline of a second function of the inventive method for estimating the dynamics reserve of the control drive.

In FIG. 3, the function DYNRES is shown diagrammatically. As input signal, a function block 30 receives, as input signal, the additional angle $\delta_M$ actually measured by the sensor 12b. This angle is filtered there and a derivative with respect to time is formed, so that the output signals of the actual, filtered additional angle $\delta_{M\_fil}$ and the actual speed of the filtered additional angle $\dot{\delta}_{M\_fil}$ are put out to a function block 31. In addition, function block 31 receives the actual outside temperature T from a temperature sensor (not shown), since the outside temperature T also has an effect on the steering system 1. The function block 31 represents a linear model of the electric moment and, from the input values $\delta_{M\_fil}$, $\dot{\delta}_{M\_fil}$ and T as output signals, determines the maximum positive and negative electric moments $M_{E\_MAX\_POS}$, $M_{E\_MAX\_NEG}$ of the control drive 9. The output signals $M_{E\_MAX\_POS}$, $M_{E\_MAX\_NEG}$, together with the outside temperature T, the actual speed of the filtered additional angle $\dot{\delta}_{M\_fil}$ and the course of the gear rack displacement 1, are transferred as input signals to a further function block 32, which is constructed as a nonlinear model of the mechanics of the steering system 1. In the model 32, estimated values for the maximum additional available additional angular velocity of the control drive 9 are now generated and compared with the actual velocity of the additional angle $\dot{\delta}_{M\_fil}$, after which the estimated values for the maximum available additional positive $\dot{\delta}_{M\_MAX\_POS}$ and negative $\dot{\delta}_{M\_MAX\_NEG}$ additional angular velocity (superimposing position velocity) of the control drive 9 are determined as output signals. Taking into consideration the fact that that the algebraic sign of the additional nominal superimposing velocity is independent of the algebraic sign of the actual absolute superimposing velocity, two different superimposing velocities (positive/negative—depending on the actual direction of rotation) must be estimated.

In a further example, the output signals $\dot{\delta}_{M\_MAX\_POS}$, $\dot{\delta}_{M\_MAX\_NEG}$ could also be transformed into average, additional front wheel angular velocities and made available.

To summarize, it may be stated that, due to the inventive method of operating the steering system 1, the dynamics or the functionality of the control drive 9 for generating the additional angle $\delta_M$ by the functions ADYN and DYNRES are monitored effectively. The information made available can be used by a defect strategy of the steering system I and by other than driving dynamics (ESP, ASR, ALS, etc.) for diagnosis, as well as for long-term observation. On the whole, this leads to an increased reliability, availability and functional reliability of the steering system 1.

The inventive method for operating the steering system 1 with the functions ADYN and DYNRES is realized in an advantageous manner as a computer program on the control device 11. For this purpose, the computer program is stored in a memory element of the control device 11 (not shown). By processing it on a microprocessor of the control device 11, the method is carried at continuously at each scanning step. The computer program may be stored on a computer-readable data storage medium (diskette, CD, DVD, hard drive, USB memory stick or the like) or on an Internet server as a computer program product and transferred from there into the memory element of the control device 11.

REFERENCE SYMBOLS

1 Steering system
2 Steering wheel
3 Articulated shaft
4 Steering gear
5a, 5b Steerable wheels
6 Gear rack
7 Pinion
8 Superimposing means
9 Control drive/electric motor
10 Superimposing gear mechanism
11 Control device
12a, 12b, 12c Sensors
20 Function Block
21 Function Block
22 Function Block
30 Function Block
31 Function Block
32 Function Block
ADYN Safety function
DYRNES Function
$\delta_S$ Steering wheel angle
$\delta_M$ Motor angle
$\delta_{Md}$ Control signal/desired motor angle
$\delta_G$ Superimposed movement/pinion angle
$\delta_{Fm}$ Steering angle $\dot{\delta}_{M\_MAX\_POS}$ Maximum, positive, additional, additional angular velocity
$\dot{\delta}_{M\_MAX\_NEG}$ Maximum, negative, additional, additional angular velocity
adyn_stat Status of the dynamics of the control
$\hat{\delta}_M$ Model-based additional angle
$\hat{\dot{\delta}}_M$ Model-based additional angular velocity
$\hat{\ddot{\delta}}_M$ Model-based additional angular acceleration
$\delta_{M\_fil}$ Additional angle (filtered)
$\dot{\delta}_{M\_fil}$ Additional angular velocity (filtered)
$\ddot{\delta}_{M\_fil}$ Additional angular acceleration (filtered)
$M_{e\_MAX\_POS}$ Maximum positive additional moment
$M_{e\_MAX\_NEG}$ Maximum negative additional moment
T Outside temperature
l Gear rack displacement velocity

The invention claimed is:

1. A method for operating a steering system of a motor vehicle, comprising:
specifying a steering wheel angle ($\delta_S$) utilizing a steering handling device, said steering wheel angle ($\delta_S$) being a measure of a desired steering angle ($\delta_{Fm}$) for at least one steerable wheel of the motor vehicle;
converting a pinion angle ($\delta_G$), which depends on the steering wheel angle ($\delta_S$), into the steering angle ($\delta_{Fm}$) of the at least one steerable wheel of the motor vehicle;
generating an additional angle ($\delta_M$) by operating a control drive;
generating the pinion angle ($\delta_G$) by superimposing the additional angle ($\delta_M$) on the steering wheel angle ($\delta_s$) by a superimposing gear mechanism;
operating the steering system and triggering the control drive by a control device of the steering system which monitors the dynamics of the control drive by at least one function (ADYN, DYNRES), on the basis of a model; and
determining, as a first function, the status (adyn_stat) of the dynamics of the control drive by means of a difference between the variation in the measured additional angle ($\delta_M$) as a function of time, and a nominal, model-based variation in the additional angle of the control drive as a function of time, the difference in the angle, angular velocity and angular acceleration being calculated in each case.

2. The method of claim 1, wherein the first function indicates that the status (adyn_stat) of the dynamics of the control drive is "O" or "OK", when the absolute amounts of all different values of angles, angular velocities and angular accelerations are less than or equal to their corresponding, specified threshold values, or "1" or "not OK" when this is not the case.

3. The method of claims 1 or 2, wherein the dynamics model (ADYN) receives a nominal value of the additional angle ($\delta_{Md}$) as input quantity and, in real-time, calculates the model-based actual value for the additional angle ($\hat{\delta}_M$), the additional angular velocity ($\hat{\dot{\delta}}_M$) and the additional angular acceleration ($\hat{\ddot{\delta}}_M$).

4. The method of claim 1, further comprising estimating, on the basis of a model, a maximum positive and/or negative available, and additional, angular velocity ($\hat{\dot{\delta}}_M$) of the control drive, using a second function (DYBRES).

5. The method of one of the claims 1, 2 or 4, wherein the outputs of the first (ADYN) and/or the second function (DYNRES) or the status (adyn_stat) of the dynamics of the control drive or the estimated maximum available additional positive and/or negative additional angular velocity ($\dot{\delta}_{M\_MAX\_POS}$), ($\dot{\delta}_{M\_MAX\_NEG}$) of the control drive are made available to other driving dynamics systems.

6. The method of one of the claims 1, 2, or 4, wherein the control device, receives or, by means of other input quantities, calculates the nominal value of the additional angle ($\delta_{Md}$), the additional angle ($\delta_M$), the pinion angle ($\delta_G$), the steering wheel angle ($\delta_S$) and the vehicle speed ($v_x$) as input quantities.

7. A computer-readable medium having stored thereon a program comprising executable code for execution by a micro-processor of a computer for carrying out the method of operating a steering system according to claim 1.

8. A computer-readable medium having stored thereon a program comprising executable code for execution by a computer processor for carrying out the method for operating a power-assisted steering system according to claim 1.

9. A control device for a steering system structurally configured for carrying out the computer program according to claim 7.

10. The method of claim 5, wherein said other driving dynamics systems include an electronic stability program, an anti-locking system or anti-slip regulation system.

11. The method of claim 10, wherein said the outputs of the first (ADYN) and/or the second function (DYNRES) or the status (adyn_stat) of the dynamics of the control drive or the estimated maximum available additional positive and/or negative additional angular velocity ($\dot{\delta}_{M\_MAX\_POS}$), ($\dot{\delta}_{M\_MAX\_POS}$) of the control drive are made available over an interface.

12. The method of claim 6, wherein said other input quantities include the rotational speed of the wheels.

13. The method of claim 6, wherein said input quantities are received from sensors or other vehicle systems by application of a suitable model.

14. The method of claim 10, wherein said suitable model is based upon the steering system.

15. The method of claim 7, wherein said micro processor of the computer includes the control device of the steering system.

16. The method of claim 8, wherein said micro processor of the computer includes the control device of the steering system.

* * * * *